(12) United States Patent
Salter et al.

(10) Patent No.: US 12,325,431 B2
(45) Date of Patent: Jun. 10, 2025

(54) VEHICLE COMPONENT IDENTIFICATION SYSTEM

(71) Applicant: Ford Global Technologies, LLC, Dearborn, MI (US)

(72) Inventors: Stuart C. Salter, White Lake, MI (US); Benjamin Solomon Richer, Arlington, VA (US); Adam Carlson, Ann Arbor, MI (US); Peter Phung, Windsor (CA); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 900 days.

(21) Appl. No.: 16/808,665

(22) Filed: Mar. 4, 2020

(65) Prior Publication Data

US 2021/0276575 A1 Sep. 9, 2021

(51) Int. Cl.
| | |
|---|---|
| *B60W 50/00* | (2006.01) |
| *B60K 35/00* | (2024.01) |
| *B60K 35/10* | (2024.01) |
| *B60K 35/65* | (2024.01) |
| *B60N 2/02* | (2006.01) |
| *B60N 2/14* | (2006.01) |
| *B60W 40/08* | (2012.01) |
| *G06F 3/01* | (2006.01) |
| *G06F 3/16* | (2006.01) |
| *G06V 20/59* | (2022.01) |

(52) U.S. Cl.
CPC ......... *B60W 50/0098* (2013.01); *B60K 35/00* (2013.01); *B60N 2/14* (2013.01); *B60W 40/08* (2013.01); *G06F 3/013* (2013.01); *G06F 3/016* (2013.01); *G06F 3/017* (2013.01); *G06F 3/167* (2013.01); *G06V 20/593* (2022.01); *B60K 35/10* (2024.01); *B60K 35/65* (2024.01); *B60K 2360/149* (2024.01); *B60N 2/0268* (2023.08); *B60W 2040/0881* (2013.01); *B60W 2540/223* (2020.02); *B60W 2540/225* (2020.02)

(58) Field of Classification Search
None
See application file for complete search history.

(56) References Cited

U.S. PATENT DOCUMENTS

| | | | |
|---|---|---|---|
| 10,384,600 B1 | 8/2019 | Lenneman et al. | |
| 11,787,671 B2 * | 10/2023 | Hofmeister | B60K 35/235 |
| | | | 701/49 |
| 2004/0220704 A1 * | 11/2004 | Lin | G06F 3/013 |
| | | | 701/1 |

(Continued)

FOREIGN PATENT DOCUMENTS

| | | |
|---|---|---|
| DE | 102017200717 A1 | 6/2018 |
| EP | 3106343 A1 | 12/2016 |

(Continued)

*Primary Examiner* — William L Bashore
*Assistant Examiner* — Koorosh Nehchiri
(74) *Attorney, Agent, or Firm* — Frank A. MacKenzie; Brooks Kushman P.C.

(57) ABSTRACT

A vehicle component is identified based on a gaze direction of an occupant in a vehicle seat. A first direction of the vehicle seat is determined relative to a forward-facing direction of a vehicle. A second direction is determined from the vehicle seat to the vehicle component. Then, the vehicle seat is rotated based on an angle between the first direction and the second direction.

12 Claims, 5 Drawing Sheets

(56) References Cited

U.S. PATENT DOCUMENTS

| | | | |
|---|---|---|---|
| 2007/0164592 A1* | 7/2007 | Gerhardt | B60N 2/02246 |
| | | | 297/344.23 |
| 2014/0350942 A1* | 11/2014 | Kady | G06F 3/038 |
| | | | 704/275 |
| 2015/0210292 A1* | 7/2015 | George-Svahn | B60W 50/10 |
| | | | 348/148 |
| 2015/0298598 A1 | 10/2015 | Nussli | |
| 2016/0216830 A1* | 7/2016 | Olien | G06F 3/1423 |
| 2017/0217445 A1 | 8/2017 | Tzirkel-Hancock et al. | |
| 2018/0015933 A1* | 1/2018 | Truong | G06F 3/04817 |
| 2018/0095590 A1* | 4/2018 | Olien | G06F 3/041 |
| 2019/0041652 A1* | 2/2019 | Murayama | G02B 27/0179 |
| 2019/0084447 A1* | 3/2019 | Lee | B60N 2/0244 |
| 2020/0164270 A1* | 5/2020 | Lin | A63F 13/26 |
| 2020/0189418 A1* | 6/2020 | Sailer | B60N 2/14 |
| 2020/0298731 A1* | 9/2020 | Pline | B60N 2/14 |
| 2020/0379558 A1* | 12/2020 | Sörner | G06F 3/013 |
| 2021/0078455 A1* | 3/2021 | Hwang | B60N 3/002 |
| 2021/0331587 A1* | 10/2021 | Kim | B60R 11/04 |
| 2021/0331605 A1* | 10/2021 | Lee | B60N 2/66 |
| 2021/0357669 A1* | 11/2021 | Kim | B60R 21/015 |
| 2022/0024491 A1* | 1/2022 | Lee | B60K 35/00 |
| 2022/0151844 A1* | 5/2022 | Shizukuishi | A61B 6/0407 |

FOREIGN PATENT DOCUMENTS

| | | | | |
|---|---|---|---|---|
| KR | 20210091394 A | * | 1/2020 | B60W 60/0013 |
| KR | 20200084609 A | * | 7/2020 | B60N 2/02246 |
| WO | WO-2020060884 A1 | * | 3/2020 | |

* cited by examiner

VEHICLE COMPONENT IDENTIFICATION SYSTEM

BACKGROUND

A vehicle may include components that allow occupants to face one another during operation of the vehicle. As one example, a vehicle may be autonomously operated, allowing occupants of the vehicle to ride in the vehicle without any of them operating the vehicle. For example, the autonomous vehicle may include seats free to rotate between rides of the vehicle between forward-facing and rearward-facing positions.

A number and complexity of vehicle components that are available to occupants have increased due to vehicle systems becoming more advanced. For example, an instrument panel often includes a multitude of buttons, knobs, touch screens, etc. As the number and complexity of the vehicle components increases, the instrument panel may be unable to support all of the vehicle components such that at least some of the vehicle components may be mounted at various positions throughout the vehicle cabin.

DETAILED DESCRIPTION

Figure 1:
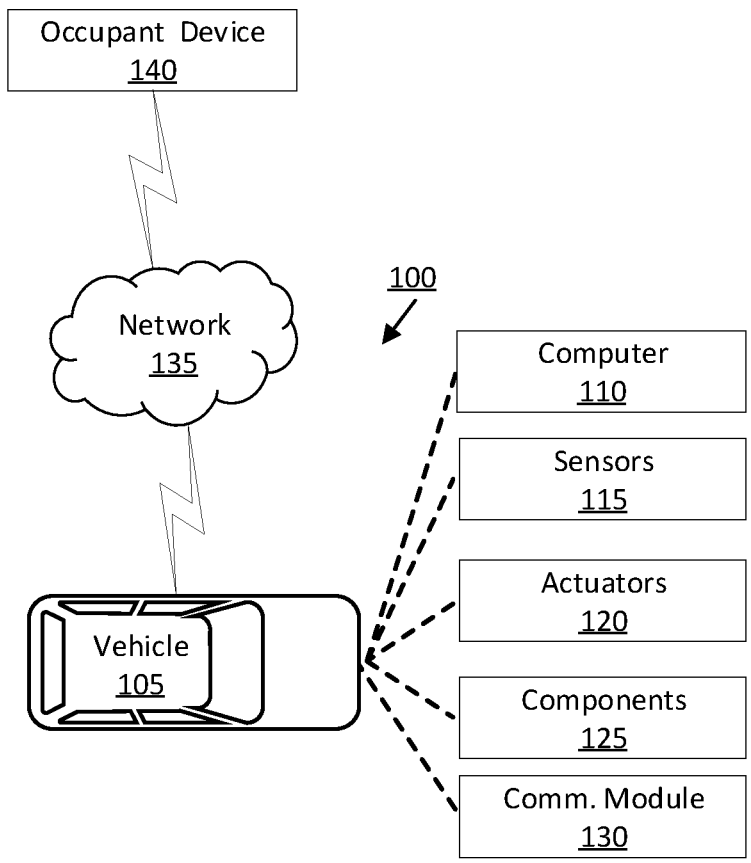
FIG. 1 is a block diagram illustrating an example vehicle component identification system for a vehicle.

A system includes a computer including a processor and a memory, the memory storing instructions executable by the processor to identify a vehicle component based on a gaze direction of an occupant in a vehicle seat. The instructions further include instructions to determine a first direction of the vehicle seat relative to a forward-facing direction of a vehicle. The instructions further include instructions to determine a second direction from the vehicle seat to the vehicle component. The instructions further include instructions to then rotate the vehicle seat based on an angle between the first direction and the second direction.

The instructions can further include instructions to, upon determining a gaze point based on the gaze direction, determine a third direction from the gaze point to the vehicle component.

The instructions can further include instructions to actuate a speaker including an audio cue specifying the third direction.

The instructions can further include instructions to actuate the vehicle component towards the gaze point.

The instructions can further include instructions to actuate an indicator including a visual cue specifying the third direction.

The instructions can further include instructions to, upon identifying the vehicle component, actuate a light on the vehicle component.

The instructions can further include instructions to identify the vehicle component based further on receiving an occupant input specifying the vehicle component.

The instructions can further include instructions to identify the vehicle component based further on detecting an occupant gesture.

The instructions can further include instructions to actuate the vehicle component towards the first direction to align the first direction and the second direction.

The instructions can further include instructions to actuate a haptic output device upon detecting a hand of the occupant within a distance threshold of the vehicle component, wherein the haptic output device is on at least one of an occupant device and the vehicle seat.

The instructions can further include instructions to actuate at least one of a speaker and an indicator upon detecting a hand of the occupant on the vehicle component via a capacitive sensor, wherein the speaker and the indicator each includes a cue specifying one or more controls of the vehicle component.

The instructions can further include instructions to actuate a haptic output device on the vehicle component upon detecting a hand of the occupant on the vehicle component.

The instructions can further include instructions to prevent rotation of the vehicle seat based on the angle being less than a threshold.

The instructions can further include instructions to prevent rotation of the vehicle seat based on the vehicle component being on the vehicle seat.

A method including identifying a vehicle component based on a gaze direction of an occupant in a vehicle seat. The method further including determining a first direction of the vehicle seat relative to a forward-facing direction of a vehicle. The method further including determining a second direction from the vehicle seat to the vehicle component. The method further including then rotating the vehicle seat based on an angle between the first direction and the second direction.

The method can further include, upon determining a gaze point based on the gaze direction, determining a third direction from the gaze point to the vehicle component.

The method can further include actuating a speaker including an audio cue specifying the third direction.

The method can further include identifying the vehicle component based further on receiving an occupant input specifying the vehicle component.

The method can further include preventing rotation of the vehicle seat based on the angle being less than a threshold.

The method can further include preventing rotation of the vehicle seat based on the vehicle component being on the vehicle seat.

Further disclosed herein is a computing device programmed to execute any of the above method steps. Yet further disclosed herein is a computer program product, including a computer readable medium storing instructions executable by a computer processor, to execute an of the above method steps.

With initial reference to FIGS. 1-4, an example vehicle control system 100 includes a vehicle computer 110 programmed to identify a vehicle component 125 based on a gaze direction G of an occupant in a vehicle seat 200. The vehicle computer 110 is further programmed to determine a first direction A of the vehicle seat 200 relative to a forward-facing direction B of a vehicle 105. The vehicle computer 110 is further programmed to determine a second direction C from the vehicle seat 200 to the vehicle component 125. The vehicle computer 110 is further programmed to then rotate the vehicle seat 200 based on an angle β between the first direction A and the second direction C.

A vehicle 105 occupant may provide input to the vehicle computer 110 via a vehicle component 125. Typically, a vehicle component 125 is associated with one or more specific operations, e.g., a knob for adjusting a volume of a radio, a knob for adjusting the climate in a vehicle 105 cabin, a switch for adjusting a window position, etc. With increasing number of vehicle components 125 in vehicles, the vehicle components 125 may be mounted at various positions throughout a vehicle 105 cabin, e.g., on an instrument panel, on a door panel, on an overhead console, etc. Advantageously, upon determining the vehicle component 125 based on the gaze direction G of the occupant, the vehicle computer 110 can rotate the seat 200 to face the vehicle component 125, which can reduce packaging constraints for the vehicle components 125 by allowing the occupant to access vehicle components 125 throughout the vehicle 105 cabin while the occupant is seated in the seat 200.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with an occupant device 140, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The vehicle sensors 115 may further include camera sensor(s) 115, e.g. front view, side view, rear view, etc., providing images from a field of view inside and/or outside the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), one or more occupant input devices (e.g., knobs, buttons, switches, levers, touchscreens, etc.), a movable seat etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle and/or to an occupant device 140. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the occupant device 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An occupant device 140 can be a conventional computing device, i.e., including one or more processors and one or more memories, programmed to provide operations such as disclosed herein. The occupant device 140 can be a portable device. A portable device can be any one of a variety of computers that can be used while carried by a person, e.g., a smartphone, a tablet, a personal digital assistant, a smart watch, etc. Further, the occupant device 140 can be accessed via the network 135, e.g., the Internet or some other wide area network.

The vehicle computer 110 can identify an occupant approaching the vehicle 105 via image data received from one or more sensors 115, e.g., by using computer vision techniques. Additionally, the vehicle computer 110 can identify cargo carried by the occupant, e.g., to be transported in the vehicle 105. For example, the vehicle computer 110 can apply object recognition techniques, such as are known, to image data to identify the cargo, e.g., a package, luggage, etc. As another example, the vehicle computer 110 can identify the occupant and/or cargo based on occupant input, e.g., to a keypad on the vehicle 105. The occupant input may specify an identifier for the occupant (e.g., an alphanumeric string of characters that identifies the occupant and/or specifies cargo for the occupant). As yet another example, the vehicle computer 110 can receive the identifier from the occupant device 140, e.g., via the network.

Upon identifying the occupant and/or cargo, the vehicle computer 110 can actuate one or more indicators to direct the occupant to a door of the vehicle 105. The vehicle computer 110 can determine the door based on, e.g., seat availability, available cargo space, etc. For example, the vehicle computer 110 can actuate an audio indicator including a cue, e.g., a message specifying the door, a tone on the door, etc., to direct the occupant to a door. Additionally, or alternatively, the vehicle computer 110 can actuate a visual indicator including a cue, e.g., lights projected on a ground surface indicating a path to the door, a visual message displayed on windows, a light on the door, etc., to direct the occupant to the door.

The vehicle computer 110 can store, e.g., in a memory, location data of objects, e.g., vehicle components 125, an instrument panel, door panels, etc., in the vehicle 105 cabin. The location data of the objects can be specified in a vehicle coordinate system, e.g., a multi-dimensional Cartesian coordinate system having a predetermined origin point included in the vehicle 105 cabin. For example, the location data may represent boundaries, i.e., three-dimensional (3D) surfaces, of the objects. In other words, the vehicle computer 110 can store, e.g., in a memory, a 3D map of the vehicle 105 cabin.

The vehicle 105 can include one or more sensors 115, e.g., camera sensors 115, mounted inside a cabin of the vehicle 105, e.g., to provide images of occupants in the vehicle 105 cabin. That is, the sensors 115 may be oriented to capture images of occupants in the vehicle 105 cabin and provide the images to the vehicle computer 110.

The vehicle computer 110 can determine a location of an occupant's eyes based on image data including the occupant. For example, upon receiving image data including an occupant from a camera sensor 115, the vehicle computer 110 can generate a depth map based on the received image data. A depth map is a set of data specifying 3D locations of points in an image. For example, a depth map may include a set of 3D coordinates for each pixel of the received camera image, e.g., with respect to the vehicle coordinate system. In other words, a depth map provides 3D location coordinates of real-world surface points represented in respective pixels of the image. For example, the depth map may include 3D location coordinates of the points visible in the image, e.g., on occupants, seats, etc., in the vehicle 105 cabin. Thus, a depth map may include 3D coordinates corresponding to each pixel of the image. The vehicle computer 110 may be programmed, using computer vision techniques, such as are known, to generate a depth map for the received image of the occupant. The vehicle computer 110 may be programmed to generate a depth map by processing image data received from two or more camera sensors 115 viewing the occupant from different locations while having an overlapping field of view. Alternatively, other techniques of generating a depth map may include use of a camera capable of detecting light fields, use of photometric stereo methods, or monocular depth estimation techniques which typically utilize a neural network based transformation of 2D image data.

Additionally, the vehicle computer 110 is programmed to determine a gaze direction G of the occupant based on the captured images, e.g., using computer vision techniques. A gaze direction G is a direction defined by a line that is an axis of an eye's lens, i.e., a direction in which a person's eyes are looking. For example, the vehicle computer 110 can determine the gaze direction G by determining a location and pose of the occupant's head and the location of the occupant's pupils with respect to the occupant's head.

Further, the vehicle computer 110 can be programmed to determine a gaze point P of the occupant based on the gaze direction G. A gaze point P is a point at which a line extending from an occupant's eyes in the gaze direction G intersects an object, i.e., a point on which the occupant's eyes are focusing. The vehicle computer 110 can determine the gaze point based on location data of the occupant's eyes, the gaze direction, and location data of the objects in the vehicle 105 cabin. For example, the vehicle computer 110 can determine a line extending in the gaze direction G from the location of the occupant's eyes and based on including the line in the map of the vehicle 105 cabin, can determine an object in the vehicle 105 cabin intersected by the line (See FIG. 4). Based on determining the object intersected by the line, the gaze point P can be determined.

Upon determining the gaze point P, the vehicle computer 110 can identify the vehicle component 125, e.g., an occupant input device. For example, the vehicle computer 110 can compare the gaze point P to area thresholds 415. Each area threshold 415 encloses an area around one respective vehicle component 125, e.g., occupant input device. The area threshold 415 may be determined by empirical testing based on, e.g., a minimum area around a vehicle component 125 that allows for a determination that an occupant is looking at the vehicle component 125. The vehicle computer 110 can store, e.g., in a memory, an area threshold 415 associated with each vehicle component 125. The vehicle computer 110 can identify the vehicle component 125 based on the gaze point P being within the area threshold 415 associated with the vehicle component 125.

Additionally, or alternatively, the vehicle computer 110 can identify the vehicle component 125 based on an occupant input. For example, the vehicle computer 110 may be programmed to receive occupant input specifying the vehicle component 125. For example, the occupant input may be a vocal request. In such an example, the vehicle computer 110 may obtain audio data including the request via a microphone, and be programmed to determine the occupant input, e.g., by using data processing techniques, such as Natural Language Processing. For example, the vehicle computer 110 may receive audio data including an occupant request "how to change the cabin temperature?" The vehicle computer 110 may be programmed to determine the vehicle component 125, e.g., occupant input device, associated with the received request, e.g., based on a look-up table or the like associating the vehicle component 125 with identified words or phrases.

As another example, the occupant input may be an occupant gesture, e.g., a hand reaching for a vehicle component 125. In such an example, the vehicle computer 110 may obtain image data including the occupant gesture via a camera sensor 115 and be programmed to determine the vehicle component 125. For example, the vehicle computer 110 can determine a direction in which an occupant is reaching relative to the sensor 115 lens using computer vision techniques, such as are known. In such an example, the vehicle computer 110 can determine the vehicle component 125 based on a location of the occupant's hand (e.g., determined via a depth map, as discussed above), location data of the vehicle components 125, and the direction the occupant is reaching. That is, the vehicle computer 110 can determine a point at which a line extending from the occupant's hand in the direction the occupant is reaching intersects an object in the vehicle 105 cabin (e.g., similar to determining the gaze point P discussed above). The vehicle computer 110 can then compare the point to the area thresholds 415 to determine the vehicle component 125, as discussed above.

Upon identifying the vehicle component 125, the vehicle computer 110 may be programmed to actuate a light on the vehicle component 125. The vehicle computer 110 may actuate the light to output a signal indicating the vehicle component 125 to the occupant. For example, the vehicle computer 110 can actuate the light to, e.g., turn on, to flash, to adjust a brightness, etc.

Figure 2:
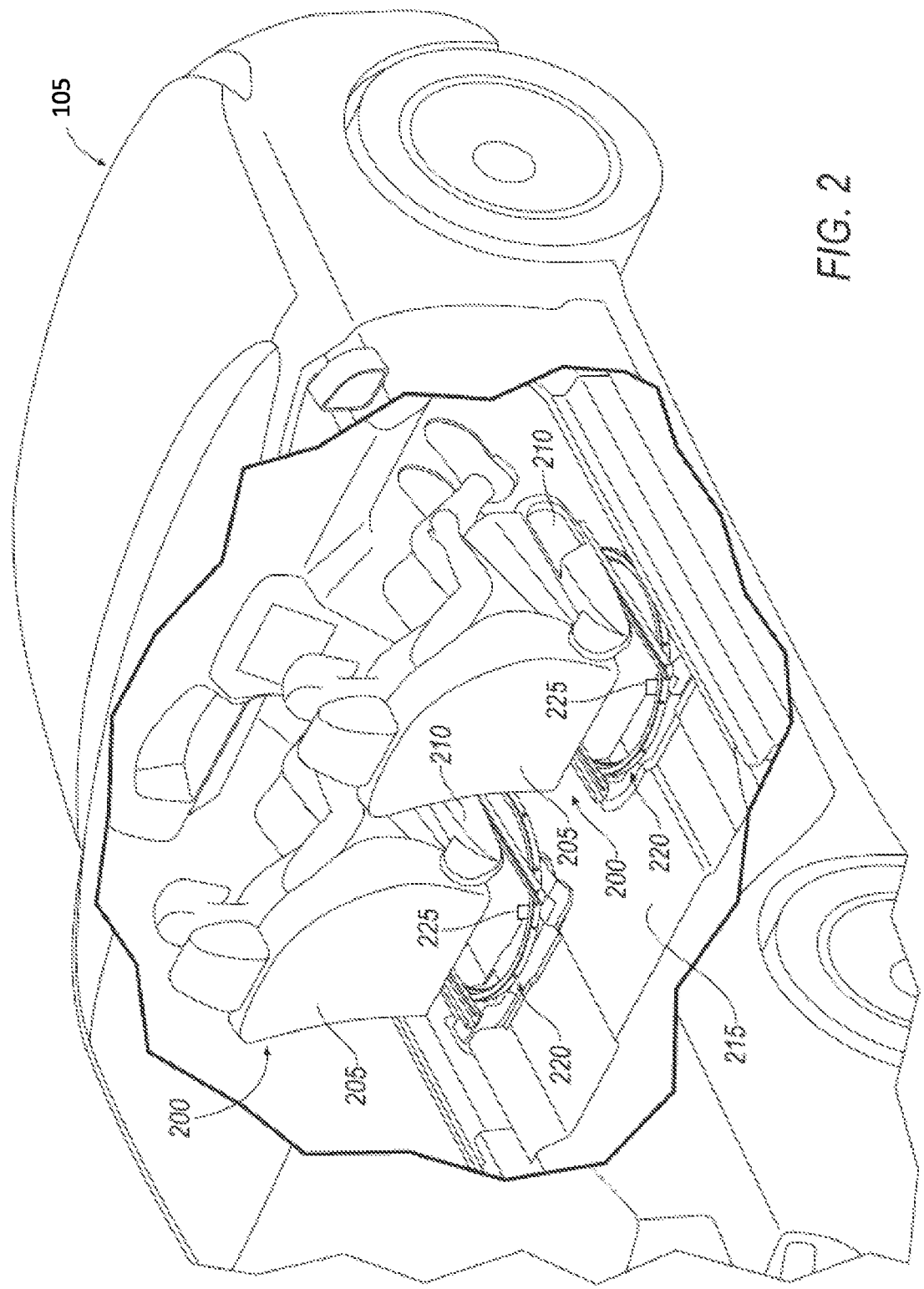
FIG. 2 is a perspective view of a vehicle including a plurality of rotatable vehicle seats.

As shown in FIG. 2, the vehicle 105 includes a plurality of seats 200. Each seat includes a respective seatback 205 and seat bottom 210. The seatback 205 may be supported by the seat bottom 210 and may be stationary or movable relative to the seat bottom 210. The seatback 205 and the seat bottom 210 may be adjustable in multiple degrees of freedom. Each seat 200 is supported by a vehicle floor 215. Each seat 200 is independently rotatable relative to the vehicle floor 215.

Each seat 200 includes a rotator 220. The rotator 220 is disposed between the seat bottom 210 and the floor 215. The rotator 220 may be mounted to the seat bottom 210. The rotator 220 may be designed to rotate the seat 200. For example, the rotator 220 may include a first ring fixed to the floor 215 and a second ring fixed to the bottom 210 and rotatable relative to the first ring. In another example not shown in the Figures, the rotator 220 may include a post mounted to the seat bottom 210, the post rotatable about an axis. Each seat 200 includes a motor 225. The vehicle computer 110 actuates the motor 225 to rotate the rotator 220 and move the seat 200.

Figure 3:
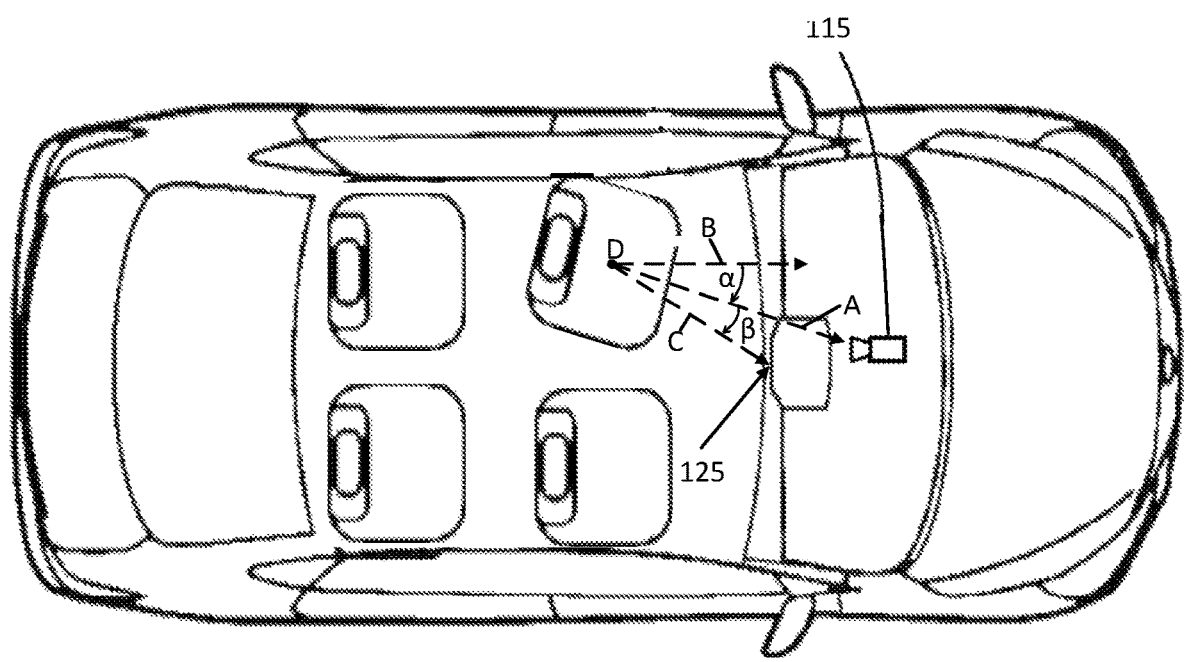
FIG. 3 is a plan view of the vehicle including the plurality of rotatable vehicle seats.
Figure 4:
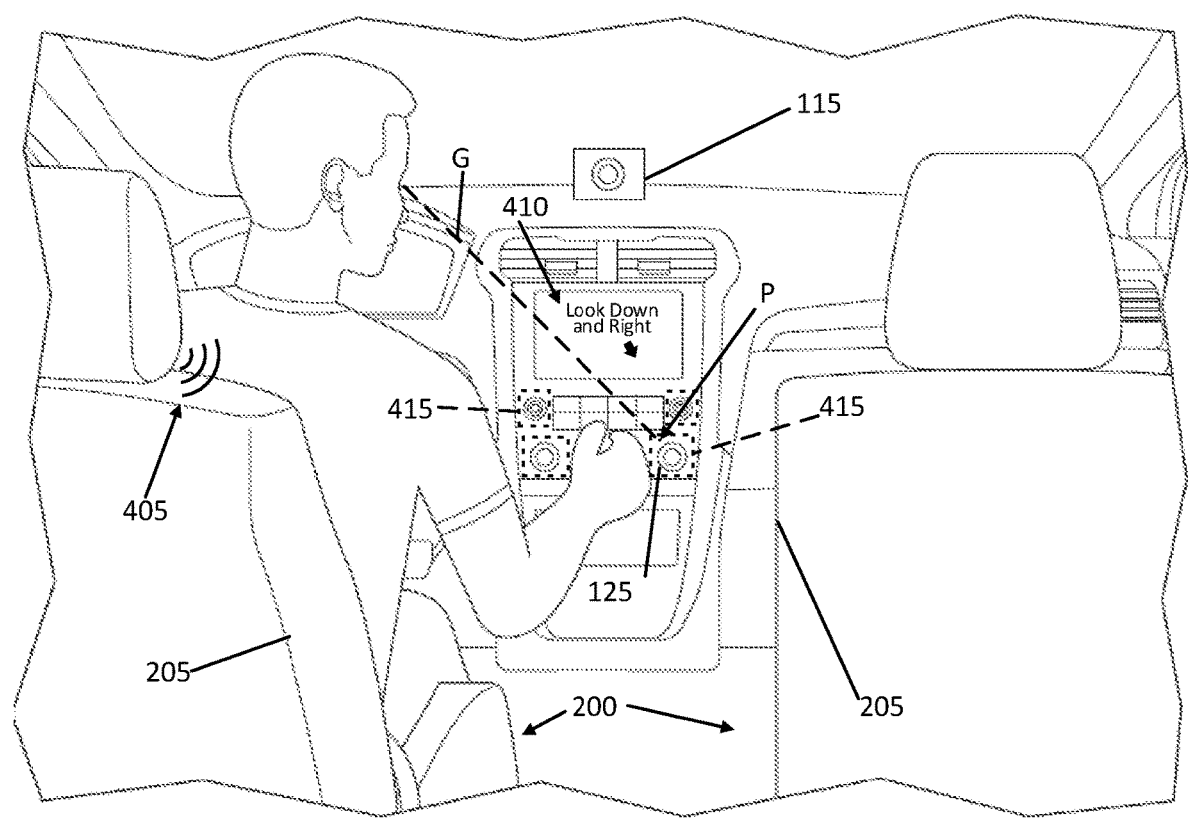
FIG. 4 is a diagram illustrating an audio cue and a visual cue.

As shown in FIG. 3, the vehicle computer 110 is programmed to determine a first direction A of the seat 200 relative to the forward-facing direction B of the vehicle 105. The first direction A extends forward relative to the seat 200. For example, the first direction A extends from the seatback 205 forward relative to an occupant of the seat 200. The vehicle computer 110 can determine the first direction A of the seat 200 based on sensor 115 data. For example, an angular sensor 115 can provide data to the vehicle computer 110 specifying an angular position of the seat 200. An angular position is an angle $\alpha$ between an axis extending in the first direction A and a forward axis about a point D on the seat bottom 210, e.g., at a center of rotation of the rotator, measured in degrees. The forward axis extends in the forward-facing direction B of the vehicle 105 regardless of the rotation of the seat 200. Based on the angular position, the vehicle computer 110 can determine the first direction A of the seat 200 relative to the forward-facing direction B of the vehicle 105.

Upon identifying the vehicle component 125 and the first direction A of the seat 200, the vehicle computer 110 can determine a second direction C based on the location of the vehicle component 125. The second direction C is a line starting at the origin in the seat 200 and ending at the vehicle component 125 in a horizontal plane defined with respect to the vehicle floor 215 in the vehicle coordinate system. The vehicle computer 110 can determine an angle $\beta$ between the first direction A and the second direction C, i.e., that the axis extending in the first direction A defines with an axis extending in the second direction C about the point D on the seat bottom 210.

The vehicle computer 110 can then compare the angle $\beta$ to an angle threshold. The angle threshold specifies a minimum angle, e.g., 5 degrees, below which the vehicle computer 110 prevents rotation of the seat. The angle threshold may be determined by empirical testing based on, e.g., a minimum angle within which occupants can identify the vehicle component 125. In the case that the angle $\beta$ is less than the angle threshold, the vehicle computer 110 prevents rotation of the seat 200. Additionally, the vehicle computer 110 may be programmed to prevent rotation of the seat 200 when the vehicle component 125 is on, i.e., fixed to and movable with, the seat 200 (e.g., a seat position control switch). In the case that the angle $\beta$ is equal to or greater than the angle threshold, the vehicle computer 110 can then actuate the rotator to rotate the seat 200 based on the angle $\beta$, e.g., to align the first direction A and the second direction C.

Additionally, upon determining the gaze point P based on the gaze direction G, the vehicle computer 110 can determine a third direction. The third direction is a line starting at the gaze point P and ending at the vehicle component 125 in a vertical plane defined with respect to the vehicle floor 215 in the vehicle coordinate system. Upon determining the third direction, the vehicle computer 110 can actuate at least one of an audio indicator, i.e., a speaker, and a visual indicator. The speaker may be mounted in the vehicle 105 cabin, e.g., on a seat 200. When the vehicle computer 110 actuates the speaker, the speaker includes an audio cue 405 specifying the third direction. The audio cue 405 directs the occupant to look in the third direction, e.g., down and right. As one example, the audio cue 405 can be a message (e.g., generated using Natural Language Processing techniques) output from the speaker specifying the third direction. As another example, the audio cue 405 can be a directional audio signal corresponding to the third direction (See FIG. 4). In such an example, the vehicle computer 110 can actuate a plurality of speakers in a speaker array to adjust parameters, e.g., phase, amplitude, etc., of the audio signals output from the respective speakers to direct an audio signal heard by the occupant in the third direction, e.g., by using signal interference techniques. Alternatively, the vehicle computer 110 can actuate a sound dome based on the third direction. A sound dome extends partially around a speaker to direct audio signals output by the speaker. In such an example, the vehicle computer 110 can actuate the sound dome to face the third direction, which can direct the audio signal output from the speaker in the third direction.

The visual indicator may be mounted in the vehicle 105 cabin, e.g., to a roof, a floor, a seatback, etc. When the vehicle computer 110 actuates the visual indicator, the visual indicator includes a visual cue 410 specifying the third direction. The visual cue 410 directs the occupant to look in the third direction, e.g., down and right. The visual cue 410 may be displayed by the visual indicator, e.g., on a touchscreen, or projected by the visual indicator, e.g., onto a window, a seatback, an instrument panel, etc. The visual cue 410 may include alphanumeric characters, symbols, lines, etc. For example, the visual cue 410 may be an arrow pointing in the third direction and/or a message specifying the third direction, e.g., "look down and right" (See FIG. 4).

Additionally, or alternatively, the vehicle computer 110 may be programmed to actuate the vehicle component 125 towards the first direction A of the seat 200. For example, the vehicle computer 110 can actuate the vehicle component 125 to move the vehicle component 125 to align the second direction C and the first direction A. Additionally, or alternatively, the vehicle computer 110 may be programmed to actuate the vehicle component 125 to align the vehicle component 125 and the gaze point P. e.g., by moving the vehicle component 125 towards the gaze point P. As one example, the vehicle component 125, e.g., a display screen, may be supported by a telescopic support pivotally connected to the instrument panel. The vehicle computer 110 can actuate a motor to pivot and extend the telescopic support to move the vehicle component 125 towards the first direction A and/or the gaze point P.

The vehicle computer 110 can be programmed to actuate a haptic output device. The haptic output device may be on at least one of the seat 200, the identified vehicle component 125, and the occupant device 140. The vehicle computer 110 can actuate the haptic output device to provide haptic output based on the vehicle computer 110 detecting a hand of the occupant on the identified vehicle component 125 and/or within a distance threshold of the vehicle component 125. For example, the vehicle computer 110 may be programmed to actuate the haptic output device, e.g., on the seat and/or the occupant device 140, to provide haptic output at first parameters, e.g., frequency, intensity, etc., when the occupant's hand is within the distance threshold. Additionally, the vehicle computer 110 may be programmed to actuate the haptic output device, e.g., on the seat and/or the occupant device 140, to provide haptic output at a second parameters, e.g., frequency, intensity, etc., when the occupant's hand is on the vehicle component 125.

The vehicle computer 110 can be programmed to detect a hand of the occupant within a distance threshold of the vehicle component 125 based on image data. For example, the vehicle computer 110 can receive image data including the occupant's hand and the vehicle component 125 and can detect the occupant's hand, e.g., using image processing techniques, such as Canny edge detection. Upon detecting the hand, the vehicle computer 110 can determine a location of the occupant's hand, e.g., via a depth map (as discussed above). The vehicle computer 110 can then determine a distance from the occupant's hand to the vehicle component 125 based on a length of a line from the location of the occupant's hand to the vehicle component 125. The vehicle computer 110 can then compare the distance to the distance threshold. The distance threshold can be determined empirically based on, e.g., determining a minimum distance between an occupant's hand and the vehicle component 125 that an occupant can identify the vehicle component 125. When the distance is equal to or less than the distance threshold, the vehicle computer 110 may be programmed to actuate the haptic output device, e.g., on the seat and/or the occupant device 140, to provide haptic output. When the distance is greater than the distance threshold, the vehicle computer 110 may be programmed to actuate the haptic output device to stop providing haptic output.

The vehicle computer 110 can detect the hand of the occupant on the vehicle component 125 based on a capacitive sensor on the vehicle component 125. For example, the vehicle computer 110 can determine the hand of the occupant is on the vehicle component 125 when the capacitive sensor detects a change in capacitance above a threshold, e.g., determined by empirically testing occupant hands on test capacitive sensors. When the occupant's hand is on the vehicle component 125, the vehicle computer 110 may be programmed to actuate the haptic output device, e.g., on the seat, the vehicle component 125, and/or the occupant device 140, to provide haptic output. Conversely, the vehicle computer 110 may be programmed to actuate the haptic output device to stop providing haptic output when the occupant's hand is not on the vehicle component 125. Additionally, or alternatively, the vehicle computer 110 can actuate at least one of the speaker and the indicator, e.g., to output a cue specifying one or more controls of the vehicle component 125. For example, the cue can specify operational instructions for the vehicle component 125.

Figure 5:
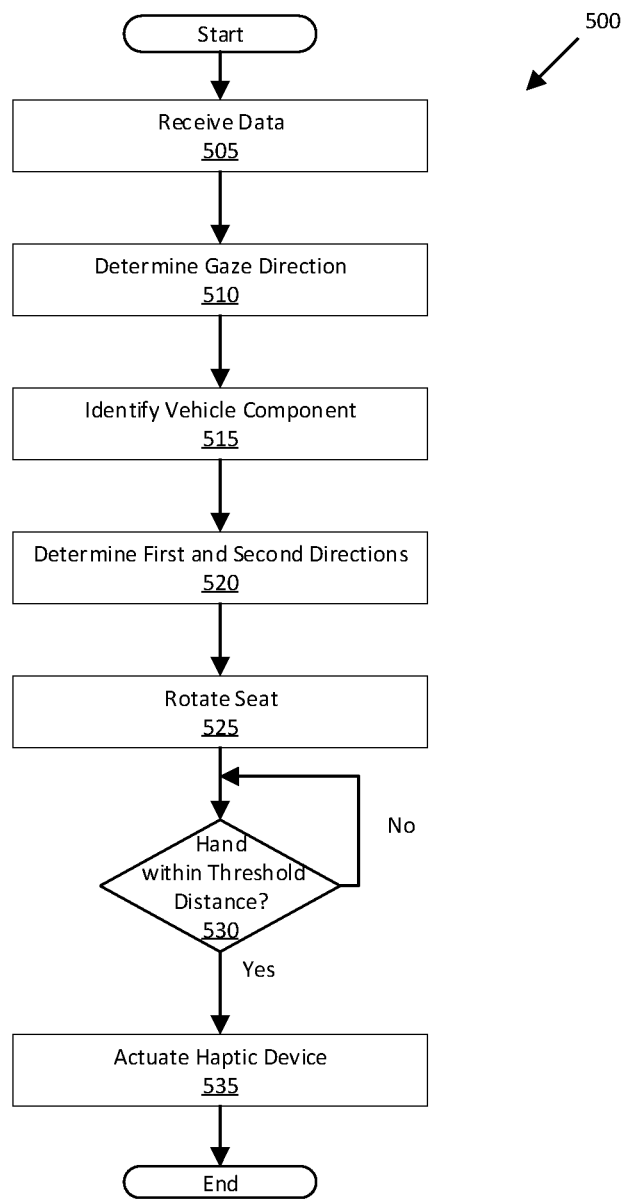
FIG. 5 is a flowchart of an example process for identifying a vehicle component.

FIG. 5 is a diagram of an example process 500 for rotating a seat 200 upon identifying a vehicle component 125. The process 500 begins in a block 505.

In the block 505, a vehicle computer 110 receives sensor 115 data, e.g., image data, from one or more sensors 115, e.g., via the vehicle network. The image data includes an occupant seated in the seat 200. The process 500 continues in a block 510.

In the block 510, the vehicle computer 110 determines a gaze direction G of the occupant in the seat 200. For example, the vehicle computer 110 can determine the gaze direction G by applying conventional computer vision techniques to the image data including the occupant. For example, the vehicle computer 110 can determine the gaze direction G by determining a location and pose of the occupant's head and the location of the occupant's pupils with respect to the occupant's head via the image data. The process 500 continues in a block 515.

In the block 515, the vehicle computer 110 identifies a vehicle component 125, e.g., a user input device, based on the gaze direction G. For example, the vehicle computer 110 can determine a location of the occupant's eye via a depth map, as discussed above. The vehicle computer 110 stores location data of objects, e.g., an instrument panel, vehicle components 125, etc., in a vehicle 105 cabin. The vehicle computer 110 can then determine a gaze point P based on determining a line extending in the gaze direction G from the location of the occupant's eyes and an object intersected by the line, as discussed above. The vehicle computer 110 can then compare the gaze point P to area thresholds 415 (as discussed above). The vehicle computer 110 identifies the vehicle component 125 based on the gaze point P being within an area threshold 415 associated with the vehicle component 125. The vehicle computer 110 can then, for example, actuate a visual cue such as a light on the vehicle component 125.

Additionally or alternatively, the vehicle computer 110 can identify the vehicle component 125 based on an occupant input. For example, the vehicle computer 110 may be programmed to receive occupant input specifying the vehicle component 125. The occupant input may be a vocal request or a user gesture, as discussed above. For example, the vehicle computer 110 may obtain audio data including the request via a microphone, and be programmed to determine the occupant input, e.g., by using data processing techniques, such as Natural Language Processing. The vehicle computer 110 may be programmed to the determine the vehicle component 125 associated with the received vocal request.

As another example, the vehicle computer 110 may obtain image data including the occupant gesture via a camera sensor 115 and execute programming to determine the vehicle component 125. For example, the vehicle computer 110 can determine a direction in which an occupant is reaching relative to the sensor 115 lens using computer vision techniques, such as are known. In such an example, the vehicle computer 110 can determine the vehicle component 125 based on a location of the occupant's hand (e.g., determined via a depth map, as discussed above), location data of the vehicle components 125, and the direction the occupant is reaching, as discussed above. The process 500 continues in a block 520.

In the block 520, the vehicle computer 110 determines a first direction A of the seat 200 relative to a forward-facing direction B of the vehicle 105. For example, the vehicle computer 110 can receive sensor 115 data, e.g., from an angular position sensor 115, specifying an angular position of the seat 200. As discussed above, the angular position is an angle α that an axis extending in the first direction A defines with a forward axis extending in the forward-facing direction B of the vehicle 105 about a point D on a seat bottom 210 of the seat 200, measured in degrees. Based on the angular position, the vehicle computer 110 can determine the first direction A of the seat 200 relative to the forward-facing direction B of the vehicle 105.

Additionally, the vehicle computer 110 can then determine a second direction C based on the location of the vehicle component 125. As discussed above, the second direction C is a line starting at the origin in the seat 200 and ending at the vehicle component 125 in a horizontal plane defined with respect to the vehicle floor 215 in the vehicle coordinate system. The vehicle computer 110 can determine an angle β between the first direction A and the second direction C. i.e., that the axis extending in the first direction A defines with an axis extending in the second direction C about the point D.

Additionally, upon determining the vehicle component 125 and the gaze point P, the vehicle computer 110 can determine a third direction based on the location of the vehicle component 125. As discussed above, the third direction is a line starting at the gaze point P and ending at the vehicle component 125 in a vertical plane defined with respect to the vehicle floor 215 in the vehicle coordinate system. The process 500 continues in a block 525.

In the block 525, the vehicle computer 110 rotates the seat 200 towards the vehicle component 125. For example, the vehicle computer 110 can actuate a motor 225 of the seat 200 to rotate a rotator 220 based on the angle β between the first direction A and the second direction C. That is, the vehicle computer 110 can rotate the seat 200 to align the first direction A and the second direction C.

Additionally or alternatively, the vehicle computer 110 can actuate at least one of a speaker and a visual indicator. The speaker includes an audio cue 405 specifying the third direction. For example, the audio cue 410 can be a verbal message and/or a directional audio signal, as discussed above. The visual indicator includes a visual cue 410 specifying the third direction. The visual cue 410 may include alphanumeric characters, symbols, lines, etc. The vehicle computer 110 can actuate the speaker and/or the visual indicator to direct the occupant to look in the third direction, i.e., move the gaze point P towards the vehicle component 125.

Additionally, or alternatively, the vehicle computer 110 can actuate the vehicle component 125 to move towards at least one of the first direction A (e.g., to align the first direction A and the second direction C) and the gaze point P (e.g., to align the vehicle component 125 and the gaze point P), as discussed above. The process 500 continues in a block 530.

In a block 530, the vehicle computer 110 can determine whether a hand of the occupant is within a distance threshold of the vehicle component 125. For example, the vehicle computer 110 can identify the hand of the occupant by using convention object recognition techniques, as discussed above. The vehicle computer 110 can then determine a distance from the hand of the occupant to the vehicle component 125, as discussed above. The vehicle computer 110 compares the distance to the distance threshold. In the case that the distance is less than the distance threshold, the process 500 continues in a block 535. Otherwise the process 500 remains in the block 530.

In the block 535, the vehicle computer 110 can actuate a haptic output device to provide haptic output. The haptic output device may be on at least one of the seat 200, the identified vehicle component 125, and an occupant device 140. For example, the vehicle computer 110 may be programmed to actuate the haptic output device, e.g., on the seat 200 and/or the occupant device 140, to provide haptic output at first parameters, e.g., frequency, intensity, etc., a hand of the occupant is within the distance threshold (as discussed above). Additionally or alternatively, the vehicle computer 110 may be programmed to actuate the haptic output device, e.g., on the seat 200 and/or the occupant device 140, to provide haptic output at a second parameters, e.g., frequency, intensity, etc., when the occupant's hand is on the vehicle component 125. For example, the vehicle computer 110 can detect the hand of the occupant on the vehicle component 125 when a capacitive sensor detects a change in capacitance above a threshold. The process 500 ends after the block 535.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   identify a vehicle component based on a gaze direction of an occupant in a vehicle seat;
   determine a first direction of the vehicle seat relative to a forward-facing direction of a vehicle;
   determine a second direction from the vehicle seat to the vehicle component, wherein the vehicle component has a fixed position in the vehicle;

then rotate the vehicle seat toward the fixed position of the vehicle component based on identifying the vehicle component and an angle between the first direction and the second direction;

actuate a haptic output device after rotating the seat toward the vehicle component upon detecting a hand of the occupant within a distance threshold of the vehicle component, wherein the haptic output device is on at least one of a portable occupant device and the vehicle seat; and prevent rotation of the vehicle seat based on the vehicle component being fixed to and moveable with the vehicle seat.

2. The system of claim 1, wherein the instructions further include instructions to, upon determining a gaze point based on the gaze direction, determine a third direction from the gaze point to the vehicle component.

3. The system of claim 2, wherein the instructions further include instructions to actuate a speaker including an audio cue specifying the third direction.

4. The system of claim 2, wherein the instructions further include instructions to actuate the vehicle component towards the gaze point.

5. The system of claim 2, wherein the instructions further include instructions to actuate an indicator including a visual cue specifying the third direction.

6. The system of claim 1, wherein the instructions further include instructions to, upon identifying the vehicle component, actuate a light on the vehicle component.

7. The system of claim 1, wherein the instructions further include instructions to identify the vehicle component based further on receiving an occupant input specifying the vehicle component.

8. The system of claim 1, wherein the instructions further include instructions to identify the vehicle component based further on detecting an occupant gesture.

9. The system of claim 1, wherein the instructions further include instructions to actuate the vehicle component towards the first direction to align the first direction and the second direction.

10. The system of claim 1, wherein the instructions further include instructions to actuate at least one of a speaker and an indicator upon detecting a hand of the occupant on the vehicle component via a capacitive sensor, wherein the speaker and the indicator each includes a cue specifying one or more controls of the vehicle component.

11. The system of claim 10, wherein the instructions further include instructions to actuate a haptic output device on the vehicle component upon detecting a hand of the occupant on the vehicle component.

12. The system of claim 1, wherein the instructions further include instructions to prevent rotation of the vehicle seat based on the angle being less than a threshold.

* * * * *